Figure 1:
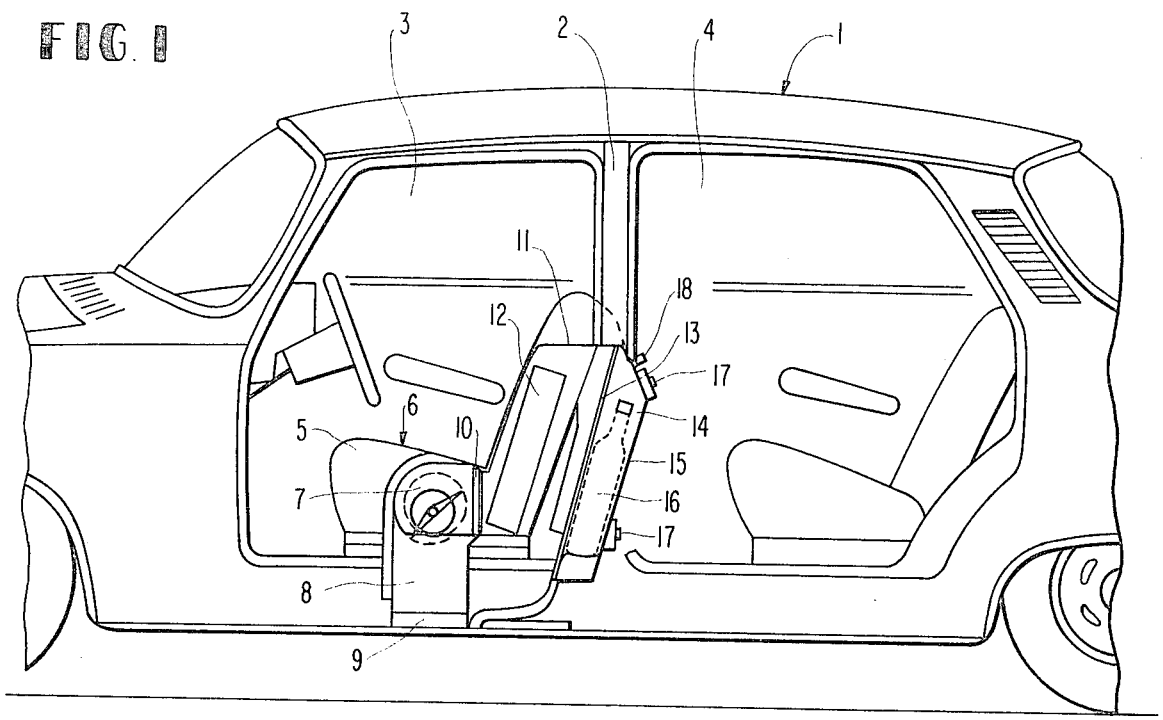

United States Patent [19]

Scharm et al.

[11] 4,258,555
[45] Mar. 31, 1981

[54] AIR-CONDITIONED PASSENGER MOTOR VEHICLE

[75] Inventors: Dieter Scharm, Dettenhausen; Ludwig Emmer, Sindelfingen; Theodor Reinhard, Böblingen; Rudi Kneib, Sindelfingen, all of Fed. Rep. of Germany

[73] Assignee: Daimler-Benz Aktiengesellschaft, Stuttgart, Fed. Rep. of Germany

[21] Appl. No.: 950,283

[22] Filed: Oct. 11, 1978

[30] Foreign Application Priority Data

Oct. 14, 1977 [DE] Fed. Rep. of Germany ....... 7731774

[51] Int. Cl.³ .............................................. B60H 3/04
[52] U.S. Cl. .................................................. 62/244
[58] Field of Search ........................................ 62/244

[56] References Cited

U.S. PATENT DOCUMENTS

| | | | |
|---|---|---|---|
| 2,070,379 | 2/1937 | Stramaglia | 62/244 X |
| 2,336,089 | 12/1943 | Gould | 62/244 X |
| 2,336,733 | 12/1943 | Hull | 62/244X |
| 2,430,335 | 11/1947 | Hart | 62/244 X |
| 2,730,866 | 1/1956 | Baker et al. | 62/244 X |
| 2,989,854 | 6/1961 | Gould | 62/244 X |
| 3,444,700 | 5/1969 | Beyer | 62/244 |
| 3,595,029 | 7/1971 | Lende, Jr. | 62/244 |

*Primary Examiner*—Lloyd L. King
*Attorney, Agent, or Firm*—Craig & Antonelli

[57] ABSTRACT

An air-conditioned passenger motor vehicle preferably with a partition wall between the front part of the passenger cell and the rear space; a separate air-conditioning installation is provided for each part of the passenger cell which consists of a blower, of an air filter, of a cooling-medium evaporator and of actuating means for the separate air-conditioning installation.

14 Claims, 2 Drawing Figures

U.S. Patent    Mar. 31, 1981    4,258,555

AIR-CONDITIONED PASSENGER MOTOR VEHICLE

The present invention relates to an air-conditioned passenger motor vehicle preferably with a partition wall between the forward part of the passenger cell and the rear space and with a cooling medium compressor for an air-conditioning installation driven by the driving engine of the vehicle.

It is difficult with air-conditioned passenger motor vehicles to establish the same ideal climatic conditions in the entire interior space, especially with passenger cells separated by a partition wall. Thus, for example, with an outside temperature of 40° C. and with a closed partition wall and with an air-conditioning installation installed in the driver space, a head temperature of 53° C. was measured in the rear space whereas, inversely, with an air-conditioning installation built into the rear space, the temperature rose to about 50° C.

It has been attempted in prior art installations of this type to supply the rear or the other part of the passenger cell with cooled air by means of a blower. Apart from the fact that it is difficult to conduct in channels the corresponding air quantity into the other part of the passenger cell, the problem of a draft-free air discharge out of the channels or ducts can hardly be solved.

It is the aim of the present invention to air-condition especially the rear part, and in the case of a partition wall, both parts of the passenger cell according to the personal needs of the passengers.

The underlying problems are solved according to the present invention in that a separate air-conditioning installation is provided for each part of the passenger cell, which consists of a blower, of an air filter, of a cooling medium evaporator and of an actuating possibility.

It is possible thereby to controllably adjust an individual space air conditioning in the rear space in vehicles without partition walls as also in each part of the passenger cell subdivided by a partition wall in motor vehicles with such partition walls. This is of significance also from an economic point of view because thermal losses, conditioned by long air channels or ducts, have been avoided. If both air-conditioning installations are turned on, one is able to adjust with an outside temperature of 40° C. a head temperature of 25° C. in the rear space of a partitioned passenger cell.

Furthermore, the rear air-conditioning installation may be arranged between the backrests of the individual front seats. The installation can be accommodated thereby favorably from a styling point of view and from a space-saving point of view without impairing the passenger cell. Additionally, each air-conditioning installation is adapted to be actuated by itself and the respective actuating buttons may be arranged within the area of the air-conditioning installation. An adjustment of the air-conditioning installation can thus be undertaken also according to personal need from each part of the separated passenger cell.

Furthermore, the actuating buttons may be covered by a preferably hinged covering, for example, adapted to be tilted down, in which, for example, a telephone may also be accommodated.

Finally, the cooling air supply of the rear space air-conditioning installation which takes place from the vehicle bottom side, may be conducted, prior to entry into the rear space, through a closet-like housing which is constructed for the storage of beverages and which is provided with a door.

The cooling medium through-flow can be utilized thereby simultaneously for cooling beverages and the like.

Accordingly, it is an object of the present invention to provide an air-conditioned passenger motor vehicle which avoids by simple means the aforementioned shortcomings and drawbacks encountered in the prior art.

Another object of the present invention resides in an air-conditioned passenger motor vehicle in which ideal climatic conditions can be established even if the driver part and the rear part of the passenger cell are subdivided by a partition wall.

A further object of the present invention resides in an air-conditioning system for air-conditioned passenger motor vehicles which assures proper air-conditioning in every part of the passenger cell without endangering the essentially draft-free discharge of the cooling air out of the cooling air channels.

Another object of the present invention resides in an air-conditioned passenger motor vehicle provided with a partition wall between the forward part of the passenger cell and the rear space, in which an individual space air-conditioning can be adjusted in each part of the passenger cell.

Still a further object of the present invention resides in an air-conditioned passenger motor vehicle of the type described above which minimizes thermal losses conditioned by long air ducts, yet permits an adjustment of the system according to personal needs of the passengers.

Another object of the present invention resides in an air-conditioned passenger motor vehicle in which the air-conditioning installation for the rear space can be readily accommodated space-savingly in a manner pleasing from a styling point of view.

A further object of the present invention resides in an air-conditioned passenger motor vehicle in which separate air-conditioning installations are provided for the driver space and for the rear space and in which the air-conditioning installation for the rear space is utilized also at the same time for purposes of cooling beverages and the like.

Figure 2:
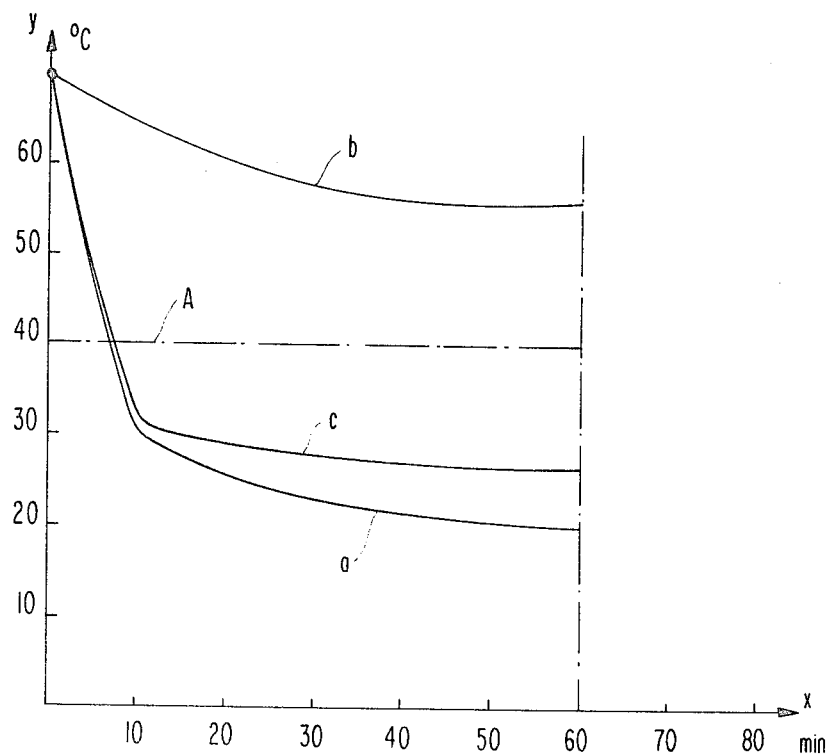

These and other objects, features and advantages of the present invention will become more apparent from the following description when taken in connection with the accompanying drawing which shows, for purposes of illustration only, one embodiment in accordance with the present invention, and wherein:

FIG. 1 is a schematic side elevational view of a passenger motor vehicle provided with a partition wall and equipped with a second air-conditioning installation in accordance wih the present invention; and FIG. 2 is a diagram with cooling curves comparing the performance of a prior art installation with that of the present invention.

Referring now to the drawing wherein like reference numerals are used to designate corresponding parts, and more particularly to FIG. 1, this figure illustrates a passenger motor vehicle generally designated by reference numeral 1 with a passenger cell subdivided into a driver space 3 and into a rear space 4 by means of a partition wall 2. A blower or fan 7 is arranged between the two front seats 5 underneath the armrest 6 and above the transmission tunnel, which is provided with a suction channel 8. An air filter 9 is connected ahead of the suction channel 8. The sucked-in air is conducted from the blower 7 through a further filter 10 to an evaporator 12 covered off by a covering 11. The now-cooled supply air flows through a perforated wall 13 into a closet-like housing 14 which is adapted to be closed by means of a door 15. The housing 14 serves for the accommodation of beverages 16 which are cooled by the supply air. The housing 14 is provided with adjustable air nozzles 17, by means of which the direction and intensity of the cooled supply air can be regulated. Additionally, the housing 14 includes actuating buttons 18 for the manual actuation of the air-conditioning installation. The same installation can be used for passenger motor vehicles without partition wall.

As can be seen from FIG. 2, the temperature in °C. is plotted along the "Y" axis and the time in minutes is plotted along the "X" axis. With an outside temperature A of, for example, 40° C., a temperature of about 65° C. will establish itself in the passenger space of a passenger motor vehicle with a turned-off air-conditioning installation. With an open partition wall in the passenger space and with a turned-on air-conditioning installation in the driver space, the temperature in the driver space drops to about 18° C. (curve a) whereas a head temperature of 52.6° C. prevails in the rear space (curve b). If, however, a separate air-conditioning installation is provided for the rear space, then a temperature of about 25° C. can also be established in this case (curve c) with a closed partition wall as also in vehicles without partition wall. The cooling medium throughflow of the air-conditioning installation provided for the rear space can be conducted through a closet-like housing and can be utilized for cooling beverages, etc.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An air-conditioned passenger motor vehicle having a passenger cell with a front seating portion and a rear seating portion and being equipped with a standard engine-driven compressor-type air conditioner comprising a first evaporator means and a first blower, partition means separating the front and rear portions, the front portion having two front seats divided by an armrest, a second blower arranged underneath the armrest, a suction channel open to the atmosphere and having a filter means in connection with the second blower, a second evaporator means located between the two front seats, a closet-like housing in communication with the second evaporator and located in the rear seating portion, actuating means for the manual actuation of the second evaporator means and the second blower, the second evaporator means and the second blower being used to cool the rear seating portion of the cell and the closet-like housing.

2. An air-conditioned passenger motor vehicle according to claim 1, characterized in that the front seats have backrests and the second evaporator means and second blower are arranged between the backrests of the front seats.

3. An air-conditioned passenger motor vehicle according to claim 2, including actuating means for the first evaporator and first blower, characterized in that the first evaporator means and the first blower, and the second evaporator means and the second blower, are actuatable individually and in that the respective actuating means include actuating buttons arranged within the area of the respective evaporator means and blower.

4. An air-conditioned passenger motor vehicle according to claim 3, characterized in that cooling air from the means is conducted, prior to entry into the rear space, through the closet-like housing means which is constructed for the accommodation of beverages and is provided with a door.

5. An air-conditioned passenger motor vehicle according to claim 4, characterized in that the suction channel provides cooling air supply for the second evaporator means from a bottom side of said vehicle.

6. An air-conditioned passenger motor vehicle according to claim 5, characterized in that the actuating buttons are covered by a covering means.

7. An air-conditioned passenger motor vehicle according to claim 6, characterized in that at least a part of the covering means is hingedly connected.

8. An air-conditioned passenger motor vehicle according to claim 7, characterized in that a telephone is accommodated inside of the covering means.

9. An air-conditioned passenger motor vehicle according to claim 8, characterized in that the partitioning means is a partition wall and in that the first evaporator means and first blower cool the front portion.

10. An air-conditioned passenger motor vehicle according to claim 1, including actuating means for the first evaporator and first blower, characterized in that the first evaporator means and the first blower, and the second evaporator means and the second blower, are actuatable individually and in that the respective acutuating means include actuating buttons arranged within the area of the respective evaporator means and blower.

11. An air-conditioned passenger motor vehicle according to claim 10, characterized in that the actuating buttons are covered by a covering means.

12. An air-conditioned passenger motor vehicle according to claim 11, characterized in that at least a part of the covering means is hingedly connected.

13. An air-conditioned passenger motor vehicle according to claim 1, characterized in that cooling air from the second evaporator is conducted, prior to entry into the rear space, through the closet-like housing means which is constructed for the accommodation of beverages and provided with a door.

14. An air-conditioned passenger motor vehcile according to claim 1, characterized in that the suction channel provides a cooling air supply for the second evaporator means from a bottom side of said vehicle.

* * * * *